M. J. PAYNE.
VALVE FOR PNEUMATIC TIRES.
APPLICATION FILED MAR. 19, 1915.
1,162,875.
Patented Dec. 7, 1915.
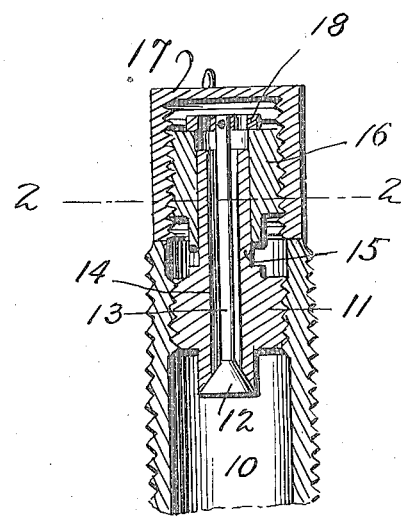
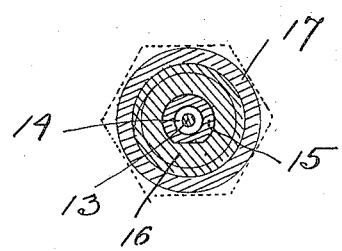
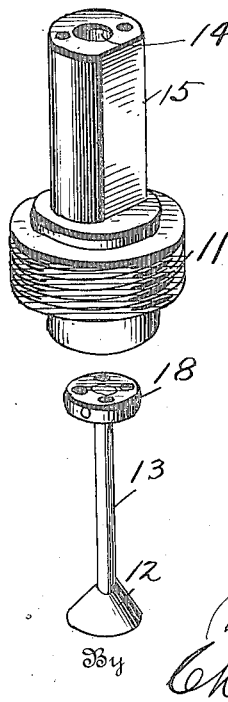
Witnesses
Geo. L. Barnes
A. T. Hayes
Inventor
Marshall J. Payne,
By Chas. J. Williamson
Attorney

UNITED STATES PATENT OFFICE.

MARSHALL J. PAYNE, OF STAUNTON, VIRGINIA.

VALVE FOR PNEUMATIC TIRES.

1,162,875.

Specification of Letters Patent.

Patented Dec. 7, 1915.

Application filed March 19, 1915. Serial No. 15,500.

*To all whom it may concern:*

Be it known that I, MARSHALL J. PAYNE, a citizen of the United States, and resident of Staunton, in the county of Augusta, and in the State of Virginia, have invented a certain new and useful Improvement in Valves for Pneumatic Tires, and do hereby declare that the following is a full, clear, and exact description thereof.

My invention relates to valves, such for example, as those used for pneumatic tires of the type in which the internal pressure on the valve is utilized to hold it to its seat, and the object of my invention is to provide a valve of this description which may be positively held upon its seat regardless of the effect of the internal pressure upon the valve, and my mechanism which will be exceedingly simple so that its parts will be few and thus liability to get out of order eliminated, the opportunities for escape of the air or other fluid under pressure reduced to a minimum, and whose operation may be performed without any special knowledge or care on the part of the operator, and to this end my invention consists in the valve constructed substantially as hereinafter specified and claimed.

In the accompanying drawings Figure 1 is a vertical section of a portion of pneumatic tire valve embodying one form of my invention; Fig. 2 a horizontal section on the line 2—2 of Fig. 1. Fig. 3 is a perspective view showing removed from the casing and separated from each other, the valve, the plug which is provided with a valve seat, and the threaded axially movable sleeve for seating the valve.

The valve casing 10 shown is of the ordinary well known construction consisting of a metal tube that reaches from within the inner tire outward and projects beyond the inner periphery of the wheel felly, and having at its outer extremity a threaded nipple for coupling the tube of the inflating pump. Within the casing 10 is screwed a block or plug 11 having at its inner end a valve seat which, as shown, is flaring or conical in form and which, of course, may be any form desired adapted to coöperate with a valve 12 on the inner end of a stem 13 that extends longitudinally through the central opening, or channel 14 in the plug 11. Such plug 11 has projecting from its outer end a concentric tubular extension 15 upon which is slidably mounted a sleeve 16 that is externally threaded and forms the nipple by which the tube of the inflating pump is coupled with the valve. Said sleeve while movable axially, or longitudinally, is prevented from rotating, or turning as by flattening, or slabbing off the periphery of the block extension 15 and conforming thereto the contiguous surface of the bore, or axial opening through the sleeve. Thus, when the usual dust cap 17 is screwed upon the sleeve and the inner end of the dust cap impinges or bears against the outer end of the valve casing 10, the sleeve 16 will be moved outward since it is incapable of rotation and can only move axially. I utilize this outward movement of the sleeve to positively seat the valve 12 upon its seat, providing for this purpose suitable coacting surfaces upon the sleeve and valve stem, which, as shown in the drawings may take the form of a head or enlargement 18 on the outer end of the valve stem which overhangs the outer end of the sleeve. By unscrewing the dust cap, obviously inward movement of the sleeve and valve may take place so that thereby the valve put in position when the tube of the inflating pump is coupled with it of allowing the air forced into the valve to lift the valve off its seat and enter the tire. As a matter of precaution in order to prevent the accidental unscrewing of the dust cap, a suitable locking device may be provided in the form of a lock nut, or other suitable device to prevent accidental turning of the dust cap.

Evidently my device is exceedingly simple in construction and operation and yet perfectly serves its purpose. The necessary act of restoring the dust cap after a tire-inflating operation is accompanied by the positive seating of the valve so that it is not dependent upon the internal pressure within the tire and the mere removal of the dust cap preliminary to coupling the tube of the inflating pump, leaves, or places the parts in condition for the inflating operation.

It is to be understood that the construction shown in the drawings is merely an illustration of one form and adaptation of my invention, the scope whereof extends to and embraces structures of diverse form and capabilities.

Inasmuch as the valve moves simply endwise, or axially to and from its seat and does not turn, wear, either of the valve, or valve seat, which would result from the grinding effect of turning, is prevented.

Having thus described my invention what I claim is—

A valve comprising a casing having a plug with an internal valve seat, a valve to coöperate with said seat having a stem extending through a channel in said plug, a tubular extension of said plug, a sleeve slidably mounted on said extension and provided with a screw thread, a removable cap engaging the thread of the sleeve and adapted to bear upon the valve casing, and means for transmitting movement of the sleeve to the valve to positively move and hold the valve to its seat.

In testimony that I claim the foregoing I have hereunto set my hand.

MARSHALL J. PAYNE.

Witnesses:
E. W. McCLUNG,
P. M. PAYNE.